July 20, 1965  J. D. COSCIONE ETAL  3,195,440
VENTILATOR FOR A VEHICLE
Filed Feb. 20, 1963  3 Sheets-Sheet 1
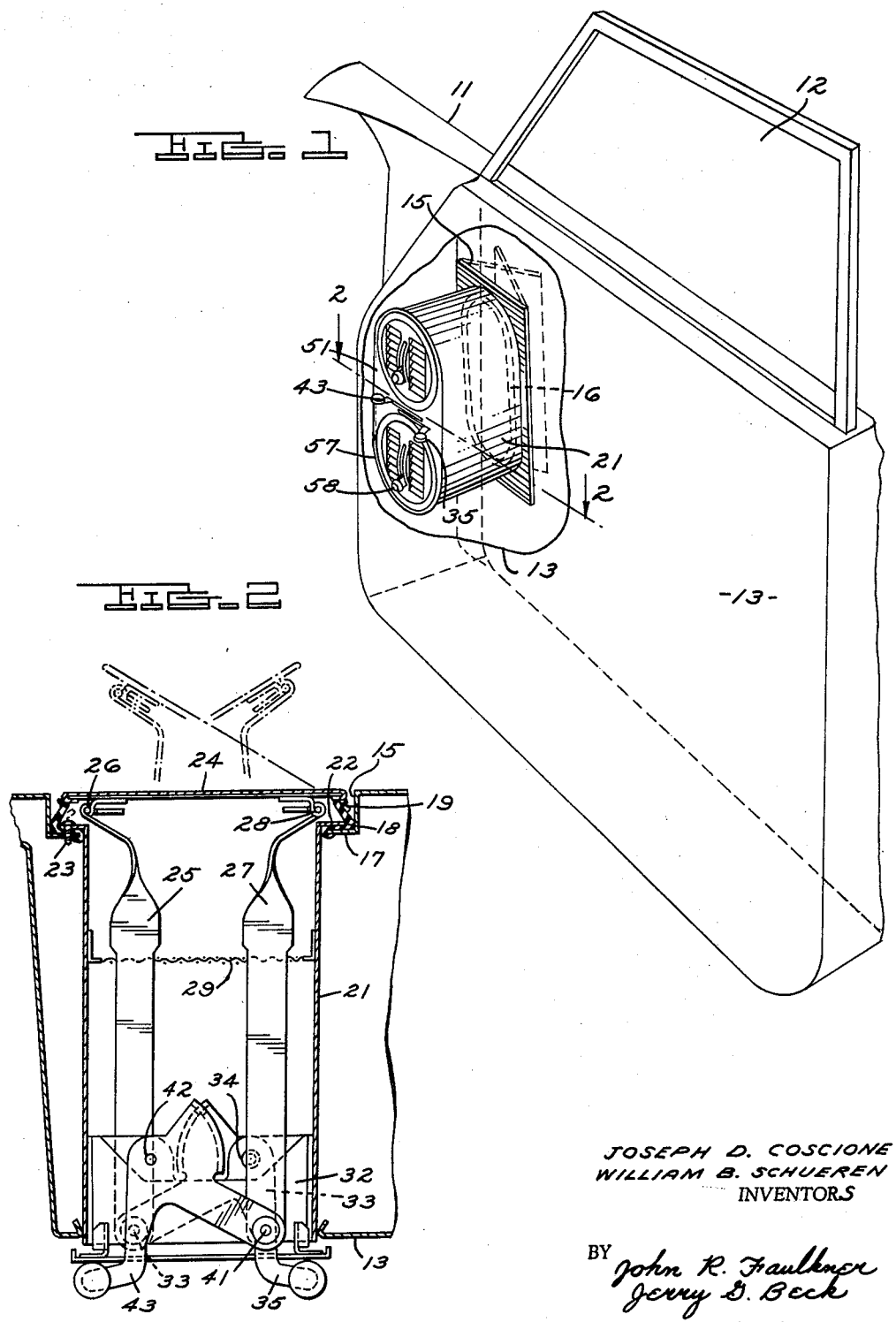
JOSEPH D. COSCIONE
WILLIAM B. SCHUEREN
INVENTORS
BY John R. Faulkner
Jerry D. Beck
ATTORNEYS

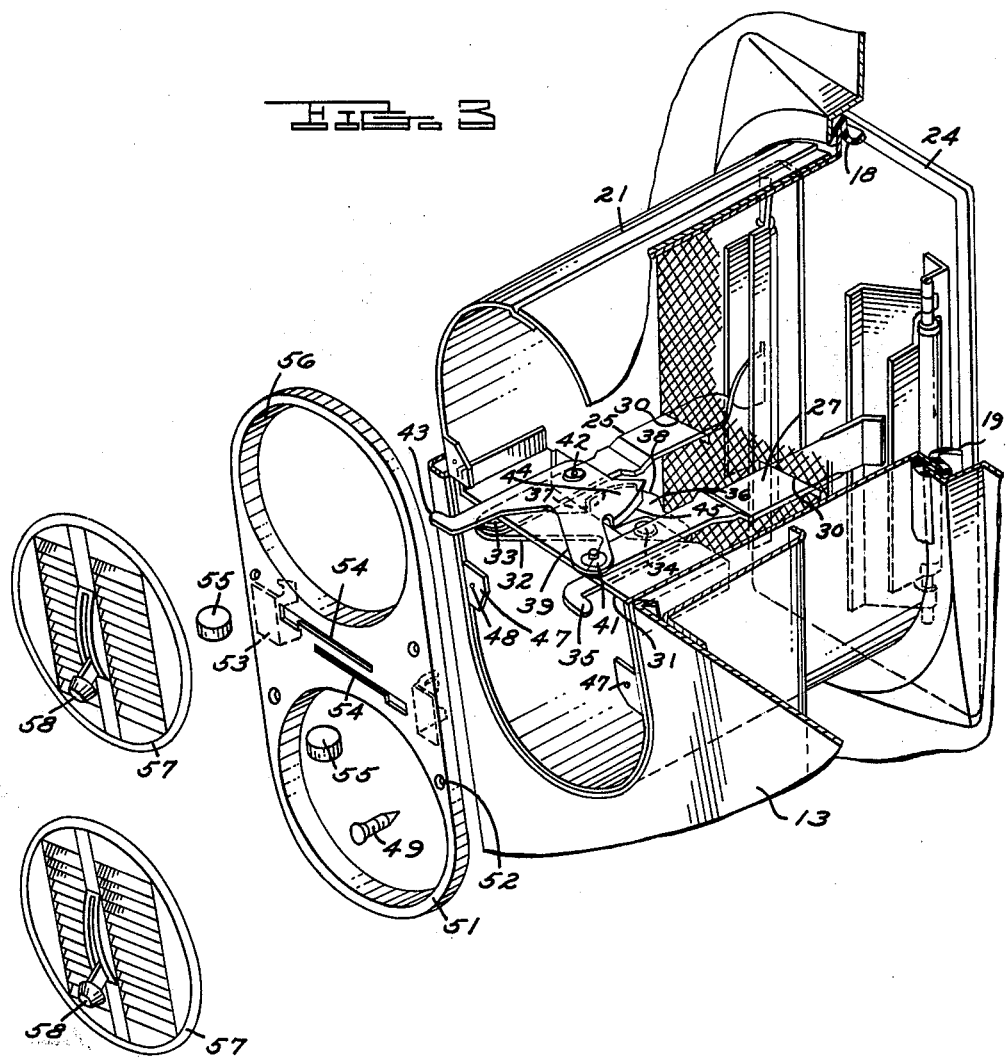

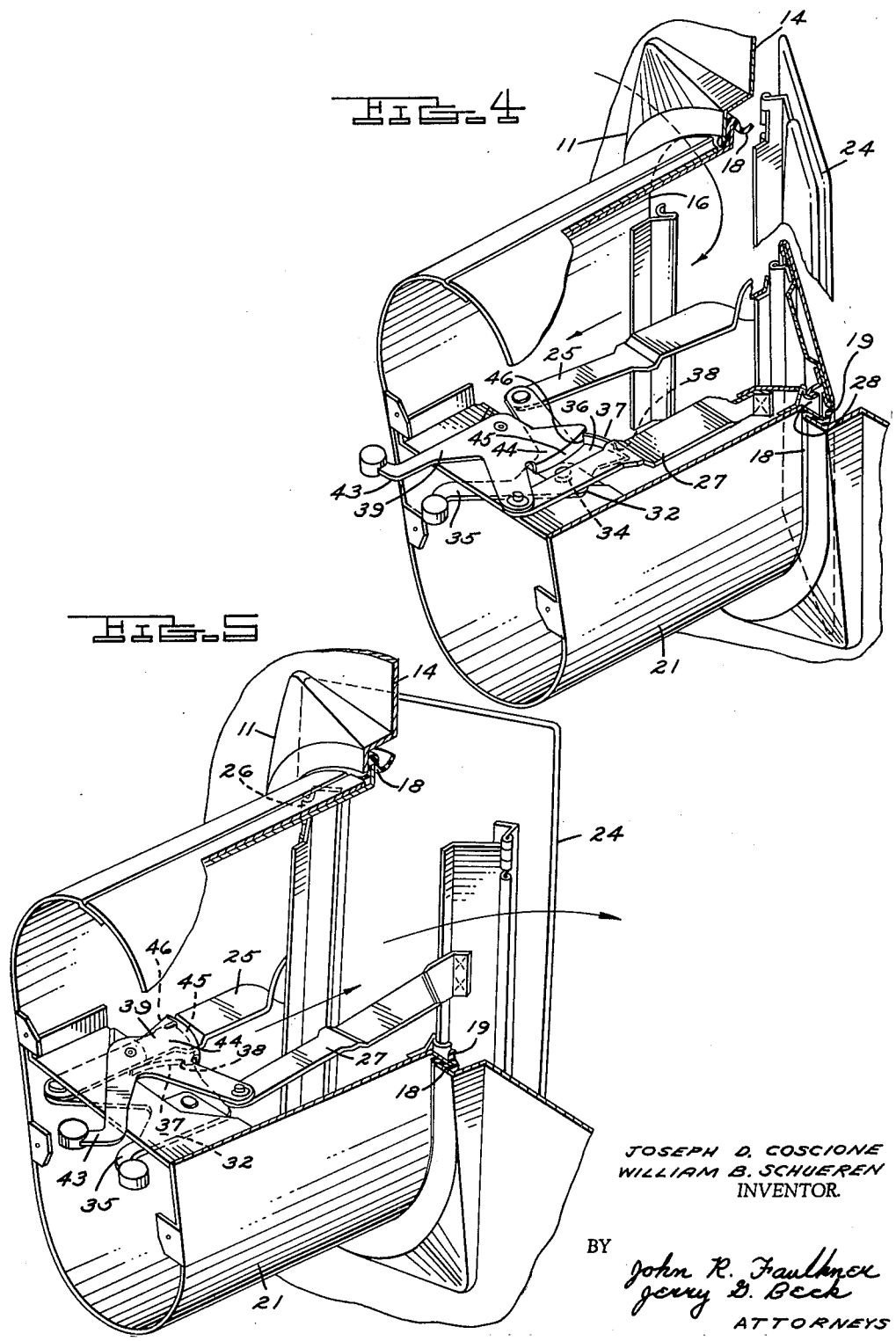

United States Patent Office 3,195,440
Patented July 20, 1965

3,195,440
VENTILATOR FOR A VEHICLE
Joseph D. Coscione, St. Clair Shores, and William B. Schueren, Detroit, Mich., assignors to Ford Motor Company, Dearborn, Mich., a corporation of Delaware
Filed Feb. 20, 1963, Ser. No. 259,979
8 Claims. (Cl. 98—2)

This invention relates to a ventilator for a vehicle body and more particularly to a ventilator for the passenger compartment of a motor vehicle, the ventilator being provided with air flow control means adapted to be selectively positioned for either air intake or exhaust.

Many ventilating systems have been devised for motor vehicles to provide for the intake of air into the passenger compartment of passenger motor vehicles or into the cab of commercial vehicles either by forcible distribution of air through a blower system or through an intake ventilator mounted in the cowl or fire wall of the vehicle body. Most of the ventilators "dump" air into the passenger compartment in the vicinity of the feet of the front seat occupants of the vehicle. This results in uncomfortable drafts, especially around the legs, as no manual control for directing or adjusting the flow of air is usually provided. Accordingly, most occupants of vehicles are very reluctant to avail themselves of the intake of fresh air by these means, especially during cold weather.

Further, in most vehicles, no specific provision is made for the exhaust of air from the passenger compartment except by opening of the vent or side windows. Besides setting up drafts, the opening of windows permits the ingress of dust, dirt and water into the passenger compartment to cause discomfort to the occupants of the vehicle.

To overcome some of these disadvantages inherent in conventional intake and exhaust ventilating means of motor vehicles, the ventilator embodying the present invention has been devised. According to the present invention, a cover member is provided for a duct means extending through a wall of a vehicle body. A first link means is pivotally connected to one side of the cover member and a second link means is pivotally connected to the other side of the cover member. These link means coact to support the cover member in juxtaposition to the exterior opening of the duct to maintain the cover member in a closed position. Either link means is operable to swing the cover member about the pivotal connection of the other link means from the closed position either to an intake position to deflect air through the duct means into the vehicle body or to an exhaust position to exhaust air through the duct means from the interior of the vehicle body to the exterior. An interlock means is provided between the respective link means to render the link means acting as the pivot for said cover member inoperative to swing the cover member about the pivotal connection of the other of the link means when the cover member is either in an exhaust or intake position.

Directional means may be attached to the inwardly extending end of the duct means to permit directional control of outside air being deflected through the duct means into the passenger compartment.

The prime object of this invention is to provide a ventilator for a vehicle body for selectively introducing air into or exhausting air from the passenger compartment or cab of a motor vehicle.

It is a further object of this invention to provide an air intake means which is relatively draft free as it may be readily adjusted to direct the flow of incoming air to suit the occupants of the vehicle.

It is a further object of this invention to provide a relatively low-cost, manually operable ventilating means adapted to be mounted in a door of a motor vehicle body to improve the ventilation of the latter.

Other objects, advantages and features of the present invention will be made more apparent as this description proceeds, particularly when considered in connection with the accompanying drawings in which:

FIGURE 1 is a perspective view of a vehicle door showing the interior panel partially cut away to expose the ventilator of this invention;

FIGURE 2 is a sectional view of the ventilator taken along line 2—2 of FIGURE 1;

FIGURE 3 is an exploded perspective view of the ventilator of this invention with the cover member for the ventilator opening shown in the closed position;

FIGURE 4 is a perspective view of the ventilator shown in FIGURE 1 with the cover member shown in an intake position; and, FIGURE 5 is a perspective view of the ventilator of FIGURE 1 with the cover member shown in an exhaust position.

Referring now to the drawings, especially FIGURES 1 and 2, there is shown a vehicle door 11 having a window 12, an interior door panel 13, and an exterior door panel 14. A rectangular-shaped indented portion 15 is formed in the exterior door panel 14 near the front edge of the door 11. A generally oval-shaped opening 16 is cut into this indented portion 15 with the remaining indented portion defining a flange 17 which circumscribes the entire opening 16. A continuous weather strip 18 is secured to the flange 17. This weather strip 18 has a diagonally extending lip 19 projecting inwardly from the flange 17 into the indented portion 15.

An oval-shaped ventilator duct 21 has a flange 22 extending outwardly from its peripheral edge which facilitates the attachment of the duct 21 to the flange 17 by sheet metal screws 23. The duct 21, which extends inwardly from the flange 17 through the vehicle door 11, has its inwardly extending end supported by the interior panel 13.

A rectangular-shaped cover member 24 is juxtapositioned to the indented portion 15 covering opening 16 so that the outer surface of the cover member 24 when in a closed position is relatively flush with the outwardly facing surface of the exterior panel 14. The cover member 24 in this closed position has its edges in contact with the lip 19 of the weather strip 18 to prevent dirt, dust and water from entering the duct 21 as best seen in FIGURE 2. One side of the cover member 24 facing towards the front of the vehicle is pivotally connected by a first link means to the duct 21. The first link means comprises a first link 25 having one end pivotally connected to the cover member 24 by a hinge assembly 26. The other side of the cover member 24 facing towards the rear of the vehicle is pivotally connected to a second link means to the duct 21. The second link means comprises a second link 27 having one end pivotally connected to the cover member 24 by a second hinge assembly 28.

The first link 25 and the second link 27 extend inwardly from their respective hinge assemblies 26 and 28 within the duct 21. The first link 25, which has its main cross sectional dimension disposed vertically at the first hinge assembly 26, is twisted 90° into a horizontal position and then slightly offset downwardly as it extends inwardly to the other end of the duct 21. The second link 27 similarly is twisted from a vertical into a horizontal direction, but it is slightly offset in an upward direction as it extends through the duct 21 as best seen in FIGURE 3.

A screen 29 extends across the entire cross sectional area of the duct 21 to prevent dirt particles, which may enter through the opening 16, from being transmitted into the passenger compartment of the vehicle. This screen 29 is provided with two horizontally extending slots 30 to permit the passage of the first and second links 25 and 27. A horizontally extending support brace 31 is mounted in the center and at the inwardly extending end of the duct 21 so that the inwardly extending end portion of the first link extends below the brace 31 and the inwardly extending end of the second link 27 extends above the brace 31. The support brace 31 may be secured to the inside surface of the duct 21 by welding or any other suitable means.

The inwardly extending end of the first link 25 is pivotally connected to one end of a first bell crank member 32 by pivot pin 33. This first bell crank member 32 extends diagonally inward from the pivot pin 33 to a point below the support brace 31 to which it is pivotally connected by a rivet 34. The first bell crank member 32 then continues outwardly from the rivet 34 below the support brace 31 and beyond the end of the duct 21 to terminate in an L-shaped handle segment 35 within the passager compartment of the vehicle. A generally sector-shaped segment 36 is integrally formed with the first bell crank element 32 adjacent its rivet connection. This sector-shaped segment 36 is provided with an upwardly extending flange 37 at its periphery with one end of the flange 37 cut away to form a notch 38 to coact with the second link 27 as hereinafter described.

The inwardly extending end of the second link 27 terminates at the inwardly extending end of the duct 21 above the support brace 31 where it is pivotally connected to one end of a second bell crank member 39 by a pivot pin 41. The second bell crank member 39 extends diagonally inwardly to a point above the support brace 31 and the first link 25, where it is pivotally connected to the support brace 31 by rivet 42. The second bell crank member 39 continues outwardly from the rivet 42 above the support brace 31 and beyond the end of the duct 21, where it terminates as an L-shaped handle segment 43 in the passenger compartment of the vehicle. A sector-shaped segment 44 is integrally formed with the second bell crank member 39 adjacent its rivet connection. This sector-shaped segment 44 has a flange 45 which extends downwardly from the periphery thereof with one end portion of the flange 45 cut away to provide a second notch 46. As best seen in FIGURE 3 the support brace 31 is partially cut away to provide clearance for the overlapping first and second sector-shaped segments 36 and 44.

The inwardly extending end of the duct 21 is provided with flange portions 47 in which holes 48 are drilled to receive sheet metal screws 49. A cover plate 51 fits over the end of the duct 21 and is attached to the flange portions 47 thereof by the sheet metal screws 49 with their threaded portion passing through clearance holes 52 punched in the cover plate 51. Two guide means 53 secured to the inside surface of the cover plate 51 facilitate the mounting thereof and provide reinforcing means therefor. Two overlapping, horizontally extending slots 54 are cut into the center portion of the cover plate 51 to allow for the passage of the L-shaped handle segments 35 and 43 through the cover plate 51 to the interior of the vehicle. A button 55 is placed on each handle segment 35 and 43 to facilitate the gripping of the first bell crank member 32 and the second bell crank member 39 by the occupant of the vehicle to position the cover member 24 to a selected opened position relative to the opening 16 as hereinafter described. Two vertically spaced circular openings 56 in the cover plate 51 receive a pair of registers 57. A control member 58 for each register 57 is movable in a vertical direction to permit the adjustment of the flow of air through the registers 57.

The operation of the ventilator of this invention can be best understood by viewing FIGURES 4 and 5. To provide for the intake of outside fresh air into the vehicle, it is necessary for the cover member 24 to be pivoted so that the side facing the front of the vehicle extends outwardly of the exterior panel 14 of the vehicle door 11 as seen in FIGURE 4. This is accomplished by swinging the handle segment 35 of the first bell crank member 32 in a clockwise direction. Swinging movement of the handle segment 35 causes the first bell crank member 32 to swing clockwise about its rivet 34, which results in the first link 25 being pushed outwardly through the oval-shaped opening 16. Since the first link 25 is pivotally hinged to the one side of the cover member 24 which is facing towards the front of the vehicle, the cover member 24 is pivoted outwardly about the second hinge assembly 28 to an intake position. The cover member 24 in this position deflects outside air through the duct 21 into the interior of the vehicle as shown by the arrows (see FIGURE 1). The pivotal axis of the second hinge assembly 28 remains in a fixed position as the second link 27 to which it is pivotally connected in not moved. When the cover member 24 is swung to its optimum intake position, the rearward edge thereof will engage the lip 19 of the weather strip 18 to prevent the air deflected inwardly from being partially exhausted.

When the handle segment 35 is swung so as to place the cover member 24 in an intake position, the second bell crank member 39 is restrained from movement by an interlocking means comprising the two overlapping sector-shaped segments 36 and 44 as hereinafter described.

As seen in FIGURE 4, the edge of the flange 45 at the notch 46 of sector-shaped segment 44 is in abutment with the upward facing flange 37 of the sector-shaped segment 36 to prevent the movement of the second bell crank member 39. When the first bell crank member 32 is swung back to its normal position so that the cover member 24 is juxtapositioned to the opening 16, the interlocking means will not restrain the movement of the second bell crank member 39.

It can best be seen in FIGURE 3 that the vertical edge of the downwardly extending flange 45 defining in part the notch 46 will clear through the notch 38 of the upwardly extending flange 37 of the first bell crank member 32 and vice versa when both handle segments 39 and 43 are in their normal position, coacting to support the cover member 24 in its closed position.

When it is desired to exhaust air from the interior of the vehicle to the exterior thereof, the handle segment 43 of the second bell crank member 39 is swung in a counterclockwise direction as seen in FIGURE 5. This causes the other side of the cover member 24 which faces the rear of the vehicle to swing outwardly, pivoting about the first hinge assembly 26. The hinge assembly 26 remains in a fixed position as the first bell crank member 32 is restrained from movement by the interlocking means heretofore described. The flow of air rushing by the opened cover member 24 creates a suction within the duct 21 to effect the exhaust of air from the interior of the vehicle body to the exterior thereof as shown by the arrows. With the cover member 24 swung to an exhaust position, the downwardly extending flange 45 of the sector-shaped segment 44 of the second bell crank member 39 abuts the vertical edge of the flange 37 at the notch 38 to prevent movement of the handle segment 35 of the first bell crank member 32.

It can be readily seen from this description that the ventilating means of this invention installed in a wall of the vehicle body permits the intake of outside air through the duct 21 into the interior of the vehicle when an occupant thereof swings the handle segment 35 in a clockwise direction. This results in the movement of one side of the cover member 24 in an outward direction with respect to the opening 16 as best seen in FIGURE 4 to deflect air through the duct 21 into the vehicle. To exhaust air from the vehicle, it is first necessary to swing the handle segment 35 back to its normal position or in a counterclockwise direction to restore the cover member 24 to its closed position. Then, the occupant of the vehicle swings the handle segment 43 in a counterclockwise direction to cause the other side of the cover member 24 to pivot outwardly as seen in FIGURE 5. The handle segment 43 can then be swung back to its normal position or in a clockwise direction to restore the cover member 24 to its closed position. It can be readily understood that the interlocking means comprising the overlapping sector-shaped segments 36 and 44 prevents the movement of either one of the bell crank members 32 and 39 when the other respective one has been swung from its normal position to an operative position to place the cover member 24 in either an exhaust or intake position.

The registers 57 mounted in the cover plate 51 can be readily adjusted by the vertical movement of the control lever 58 by the occupant of the vehicle to control the flow of air being deflected through the duct 21 in any direction as it enters the passenger compartment to suit the comfort of the occupants of the motor vehicle.

It will be understood that this invention is not to be limited to the exact construction shown and described but that various changes and modifications may be made without departing from the spirit and scope of the invention as defined in the appended claims.

We claim:

1. In a ventilator for a vehicle body having a ventilation duct extending through the wall of said vehicle body, a swingable cover member adapted to cover the exterior opening of said duct when in a closed position, a first link means mounted for pivotal movement and operatively connected to one side of said cover member to swing the latter to an open intake position from said closed position to deflect outside air into said ventilation duct, a first manually operable means coupled to said first link means and operative to pivotally move the latter, a second link means mounted for pivotal movement and operatively connected to the other side of said cover member to swing the latter to an open exhaust position from said closed position to exhaust air through said ventilation duct from the interior to the exterior of said vehicle body, a second manually operable means coupled to said second link means and operative to pivotally move the latter, and interlocking means intermediate said first and second link means allowing operation of either one or the other of said operable means to allow pivotal movement of the respective link means coupled thereto thereby swinging said cover member to an intake or exhaust position respectively from a closed position.

2. In a ventilator for a vehicle body having a duct extending through a wall of said body, a swingable cover member adapted to be juxtapositioned to the exterior opening of said duct when in a closed position, a first link means pivotally connected to said cover member at one side thereof, a first operable lever coupled to said first link means, a second link means pivotally connected to said cover member at the other side thereof, a second operable lever coupled to said second link means, said first link being operable to swing said cover member about the pivotal connection of said second link means from said closed position to an intake position to deflect outside air into said duct, said second link means being operable to swing said cover member about the pivotal connection of said first link means from said closed position to an exhaust position to exhaust air through said duct from the interior to the exterior of said vehicle body, and interlocking means between said first and second link means rendering one or the other of said levers inoperative to swing said cover member to an exhaust or intake position respectively until said cover member has been restored to its closed position.

3. In a motor vehicle, a vehicle body, a ventilating means for said vehicle body comprising a duct means extending through a wall of said body, a cover member for said duct means, a first link having one end pivotally connected to one side of said cover member, a second link having one end pivotally connected to the other side of said cover member, said first and second links supporting said cover member in juxtaposition to the exterior opening of said duct means, a first bell crank member pivotally connected to the other end of said first link, a second bell crank member pivotally connected to the other end of said second link, said first and second bell crank members being pivotally supported from said duct means and extending into said vehicle body, swinging movement of said first bell crank member causing said cover member to pivot to an intake position about the pivotal connection between said second link and said cover member to deflect outside air into said duct means, swinging movement of said second bell crank member causing said cover member to pivot about the pivotal connection between said first link and said cover member to exhaust air through said duct means from the interior of said vehicle body, said first bell crank member and said second bell crank member having each a segment integrally formed therewith, said segments interlocking to prevent the swinging movement of said first bell crank member when said cover member is in an exhaust position and to prevent swinging movement of said second bell crank member when said cover member is in an intake position.

4. The device as described in claim 3 and which is further characterized in that each segment has a flange provided with a notch at one end thereof, the flange of each segment overlapping each other, the flange of one segment being passable through the notch of the other segment upon swinging movement of either one of said bell crank members when said cover member is in a closed position.

5. In a motor vehicle, a vehicle body, a ventilating means therefor comprising a ventilation duct extending through a wall of said body, a cover member for said duct, a first link having one end pivotally connected to one side of said cover member, a second link having one end pivotally connected to the other side of said cover member, said first and second links supporting said cover member in juxtaposition to the exterior opening of said duct to place said cover member in a closed position, a first bell crank member pivotally connected to the other end of said first link, a second bell crank member pivotally connected to the other end of said second link, said first and second bell crank members being pivotally supported from said duct and having terminal handle segments integrally formed therewith extending into said vehicle body from said duct, swinging movement of the handle segment of said first bell crank member causing said cover member to swing to an intake position about the pivotal connection between said second link and said cover member to deflect outside air into said duct, swinging movement of the handle segment of said second bell crank member causing said cover member to be swung to an exhaust position about the pivotal connection between said first link and said cover member to exhaust air through said duct from the interior of said vehicle body to the exterior thereof, a first sector-shaped segment integrally formed with said first bell crank member, a second sector-shaped segment integrally formed with said second bell crank member, said first segment interlocking said second segment when said cover member is in an intake position to prevent the swinging movement of the handle segment of the second bell crank member, and said second segment interlocking said first segment when said cover member is in an exhaust position to prevent the swinging movement of the handle segment of the first bell crank member.

6. In a motor vehicle, a vehicle body, a ventilating means therefor comprising a duct extending through a wall of said body, a cover member for said duct, a first link having one end pivotally connected to one side of said cover member, a second link having one end pivotally connected to the other side of said cover member, said first and second links supporting said cover member in juxtaposition to the exterior opening of said duct, a first bell crank member pivotally connected to the other end of said first link, a second bell crank member pivotally connected to the other end of said second link, a support brace in said duct, said first and second bell crank members being pivotally attached to said support brace and having terminal handle segments integrally formed therewith extending from within said duct into said vehicle body, said first bell crank member and said second bell crank member being in a vertical spaced relationship with respect to said support brace, swinging movement of the handle segment of said first bell crank member causing one side of said cover member to swing to an intake position about the pivotal connection at the other side of said cover member to deflect outside air into said duct, swinging movement of the handle segment of said second bell crank member causing the other side of said cover member to be swung to an exhaust position about the pivotal connection at the one side of said cover member to exhaust air through said duct from the interior to the exterior of said vehicle body, said first bell crank member and said second bell crank member having segments overlapping each other, said segments being provided with interlocking means to restrain the swinging movement of the handle segment of said first bell crank member when said cover member is in an exhaust position and the swinging movement of the handle segment of said second bell crank member when said cover member is in an intake position.

7. In a motor vehicle, a vehicle body, a ventilating means comprising a duct extending through a wall of said body, a cover member for the exterior opening of said duct, a cover plate for the interior opening of said duct, a first link having one end pivotally connected to one side of said cover member, a second link having one end pivotally connected to the other side of said cover member, said first and said second links supporting said cover member in a closed position in juxtaposition to the exterior opening of said duct, a first bell crank member pivotally connected to the other end of said first link, a second bell crank member pivotally connected to the other end of said second link, said first and second bell crank members being pivotally supported from said duct and having handle segments extending through said cover plate into said vehicle body, swinging movement of the handle segment of said first bell crank member causing said cover member to swing to an intake position about the pivotal connection between said second link and said cover member to deflect outside air into said duct, swinging movement of the handle segment of the second bell crank member causing said cover member to be swung to an exhaust position about the pivotal connection between said first link and said cover member to exhaust air through said duct from the interior to the exterior of said vehicle body, said first bell crank member and said second bell crank member having overlapping segments, said segments interlocking to prevent the swinging movement of the handle segment of said first bell crank member when said cover member is swung to an exhaust position and preventing swinging movement of the handle segment of said second bell crank member when said cover member is swung to an intake position, directional means mounted in said cover plate, and adjustable means for said directional means to adjust the flow of air from said duct into said vehicle body when said cover member is in an intake position.

8. In a motor vehicle, a vehicle body, a ventilating means comprising a duct extending through a wall of said body, a cover member for the exterior opening of said duct, a cover plate for the interior opening of said duct, a first link having one end pivotally connected to one side of said cover member, a second link having one end pivotally connected to the other side of said cover member, said first and said second links supporting said cover member in a closed position in juxtaposition to the exterior opening of said duct, a first bell crank member pivotally connected to the other end of said first link, a second bell crank member pivotally connected to the other end of said second link, said first and second bell crank members being pivotally supported from said duct and having handle segments extending through said cover plate into said vehicle body, swinging movement of the handle segment of said first bell crank member causing said cover member to swing to an intake position about the pivotal connection between said second link and said cover member to deflect outside air into said duct, swinging movement of the handle segment of the second bell crank member causing said cover member to be swung to an exhaust position about the pivotal connection between said first link and said cover member to exhaust air through said duct from the interior to the exterior of said vehicle body, said first bell crank member having a first segment integrally formed therewith, said second bell crank member having a second segment integrally formed therewith, said first segment and said second segment being in a spaced rotational relationship, said first segment having a peripheral flange, said second segment having a peripheral flange, said peripheral flanges overlapping each other, said flange of the second segment being in abutment with the flange of said first segment when the handle segment of the first bell crank member has swung said cover member to an intake position to restrain the swinging movement of the handle segment of said second bell crank member, and said flange of the first segment being in abutment with the flange of said second segment when the handle segment of the second bell crank member has swung said cover member to an exhaust position to restrain the swinging movement of the handle segment of said first bell crank member.

References Cited by the Examiner

UNITED STATES PATENTS

| | | | |
|---|---|---|---|
| 1,937,952 | 12/33 | Galamb | 98—2 |
| 2,443,454 | 6/48 | Hennessy | 98—2 |

ROBERT A. O'LEARY, *Primary Examiner.*

MEYER PERLIN, *Examiner.*